United States Patent [19]

Nakamura et al.

[11] Patent Number: 4,488,700
[45] Date of Patent: Dec. 18, 1984

[54] MOTOR SUPPORT APPARATUS

[75] Inventors: Toshiaki Nakamura; Nobuhiro Miyabayashi, both of Tokyo, Japan

[73] Assignee: Olympus Optical Co., Ltd., Tokyo, Japan

[21] Appl. No.: 384,419

[22] Filed: Jun. 2, 1982

[30] Foreign Application Priority Data

Jun. 9, 1981 [JP] Japan ............................. 56-84499[U]

[51] Int. Cl.³ .............................................. F16M 13/00
[52] U.S. Cl. ..................................... 248/633; 310/51
[58] Field of Search ............... 248/602, 632, 633, 634, 248/27.1; 267/141; 310/51, 91

[56] References Cited

U.S. PATENT DOCUMENTS

| | | | |
|---|---|---|---|
| 1,978,158 | 10/1934 | Kroenlein | 310/51 |
| 2,304,476 | 12/1942 | Poplawski | 310/51 |
| 2,352,591 | 6/1944 | Wallerstein, Jr. | 248/27.1 |
| 2,520,757 | 8/1950 | Cain | 248/632 |
| 3,098,958 | 7/1963 | Katz . | |
| 3,800,449 | 4/1974 | Minatodani | 248/632 |
| 4,260,208 | 4/1981 | Lun Ho | 248/632 |

FOREIGN PATENT DOCUMENTS

| | | | |
|---|---|---|---|
| 342105 | 1/1931 | United Kingdom | 248/632 |
| 2011579 | 7/1979 | United Kingdom | 267/141 |

Primary Examiner—William H. Schultz
Assistant Examiner—Robert A. Olson
Attorney, Agent, or Firm—Frishauf, Holtz, Goodman and Woodward

[57] ABSTRACT

A motor support apparatus comprises at least one shock absorbing member which elastically supports a motor and which includes a cylindrical portion made of an elastic material, a support portion disposed at one end of the cylindrical portion and mounted on an outer surface of the motor, and a fixing portion disposed at the other end of the cylindrical portion; and a support member which securely fixes the fixing portion of the shock absorbing member to support the shock absorbing member in a state to project toward the motor.

12 Claims, 3 Drawing Figures

MOTOR SUPPORT APPARATUS

BACKGROUND OF THE INVENTION

The present invention relates to a motor support apparatus for supporting a motor mounted in a main body of equipment such as a cassette tape recorder.

A motor mounted in a main body of equipment such as a cassette tape recorder is generally fixed with screws on a support plate secured on the main body. However, motor vibration is transmitted to the main bodies through the support plates with this arrangement. Especially in the case of a cassette tape recorder, motor vibration adversely affects tape transport conditions. In order to eliminate this, a plurality of elastic washers are fitted around the screws and located on the sides of the support plate. These elastic washers thus damp the vibration. However, they are compressed by the fastening force of the screws, so that elasticity of the elastic washers is impaired. As a result, motor vibration cannot be sufficiently eliminated. Further, although the elastic washers can more or less damp the vibration in the axial directions of the screws, they can hardly damp the vibration in the directions perpendicular to the axial directions of the screws. Further, since the motor is screwed on the support plate, screw holes must be formed in the motor, resulting in a complex manufacturing processing.

SUMMARY OF THE INVENTION

The present invention has been made to solve the above problems and has for its object to provide a motor support apparatus which sufficiently damps motor vibration and which is capable of supporting the motor without requiring a special processing.

According to one aspect of the present invention, there is provided a motor support apparatus comprising at least one shock absorbing member which elastically supports a motor and which includes a cylindrical portion made of an elastic material, a support portion disposed at one end of the cylindrical portion and mounted on an outer surface of the motor, and a fixing portion disposed at the other end of the cylindrical portion; and a support member which securely fixes the fixing portion of the shock absorbing member to support the shock absorbing member in a state to project toward the motor.

The cylindrical portion of the shock absorbing member is made of an elastic material and formed in a cylindrical shape. Therefore, motor vibration is damped by the shock absorbing member and is not transmitted to the support member. Further, since the motor is supported by the shock absorbing member, special processing such as screw hole formation processing is not required.

BRIEF DESCRIPTION OF THE DRAWINGS

FIGS. 1 and 2 show a motor support apparatus according to one embodiment of the present invention, in which FIG. 1 is a partially cutaway side view thereof and FIG. 2 is a bottom view thereof.

DETAILED DESCRIPTION OF THE PREFERRED EMBODIMENTS

Figure 1:
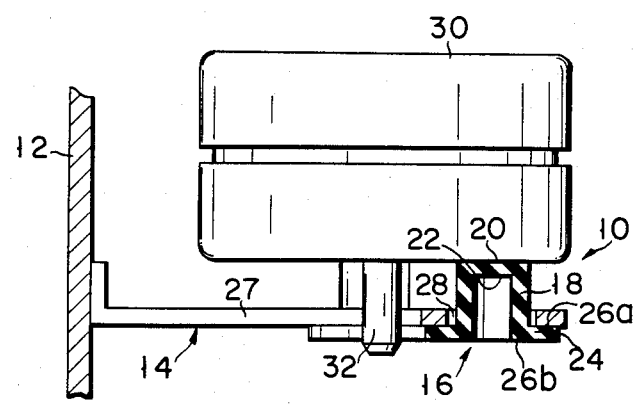
Figure 2:
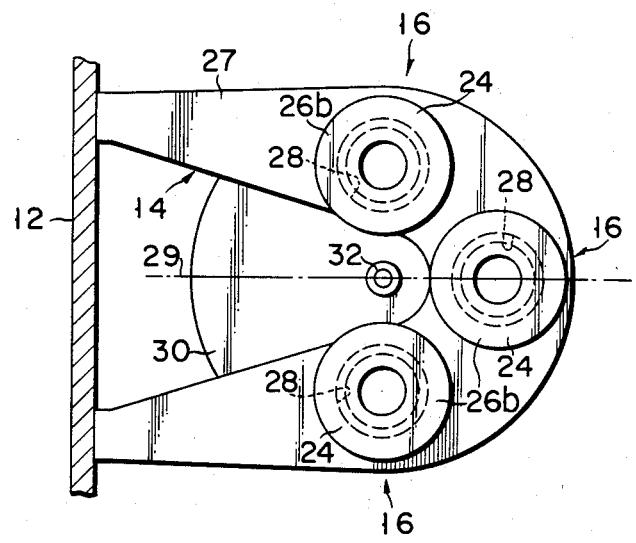

A motor support apparatus according to one embodiment of the present invention will be described with reference to FIGS. 1 and 2.

A motor support apparatus 10 has a support member 14 mounted to a case 12 of a main body of equipment such as a cassette tape recorder, and three shock absorbing members 16 fixed to the support member 14. Each shock absorbing member 16 comprises a cylindrical portion 18 which has upper and lower openings at both ends thereof, and a support portion 22 which has a flat support surface 20 perpendicular to the axis of the cylindrical portion 18 so as to close the upper opening of the cylindrical portion 18. The shock absorbing member 16 further has an annular fixing portion 24 which extends radially outward from the outer circumferential surface at the lower end of the cylindrical portion 18 and which is coaxial with the cylindrical portion 18. The fixing portion 24 has a first fixing surface 26a at the side of the upper end of the cylindrical portion 18 and a second fixing surface 26b at the side of the lower end of the cylindrical portion 18. The first and second fixing surfaces 26a and 26b are perpendicular to the axis of the cylindrical portion 18. The cylindrical portion 18, the support portion 22 and the fixing portion 24 are integrally formed by an elastic material such as rubber. The support member 14 has a substantially U-shaped plate 27 which is symmetrical about a line 29. The U-shaped plate 27 has three through holes 28 each having a circular section. The three through holes 28 correspond to the three absorbing members 16, respectively. One of the through holes 28 is on the line 29 and the other through holes 28 are located on both sides of the line 29, respectively. Each through hole 28 has a diameter which is larger than the outer diameter of the cylindrical portion 18 of the shock absorbing member 16 and is smaller than the outer diameter of the fixing portion 24.

The shock absorbing members 16 are inserted in the through holes 28 from below so as to be coaxial therewith, respectively. The first fixing surfaces 26a of the fixing portions 24 are adhered to the lower surface of the U-shaped plate 27. The cylindrical portions 18 extend vertically upward from the U-shaped plate 27 through the through holes 28, respectively. The support surfaces 20 of the support portions 22 are spaced apart from the upper surface of the U-shaped plate 27 at a predetermined distance and are parallel to the upper surface thereof. The support surfaces 20 are on the same plane. Since the diameter of each through hole 28 is larger than the outer diameter of the cylindrical portion 18 of the shock absorbing member 16, the outer circumferential surface of the cylindrical portion 18 is spaced apart from the inner circumferential surface of the through hole 28 at a predetermined distance. This predetermined distance is preferably about 10 to 20% of the outer diameter of the cylindrical portion 16. The lower surface of the motor 30 is adhered to the support surfaces 20 of the support portions 20 and the motor is elastically supported by the shock absorbing members 16. The motor 30 is so supported that a motor shaft 32 thereof is located on the line 29 and the lower surface of the motor 30 is parallel to the upper surface of the U-shaped plate 27.

According to the motor support apparatus 10 with the above arrangement, since the motor 30 is supported by the shock absorbing members 16, motor vibration in the axial direction of the cylindrical portions 18 and in the direction perpendicular thereto is damped by the cylindrical portions 18 of the shock absorbing members 16. Further, since the shock absorbing members 16 are arranged so that their outer circumferential surfaces are spaced apart from the inner circumferential surfaces of the through holes 28 at a predetermined distance, respectively, the outer circumferential surfaces of the cylindrical portions 18 may not come in contact with the inner circumferential surfaces of the through holes 28, respectively, even if the cylindrical portions 18 of the shock absorbing members 16 are deformed by the motor vibration. Therefore, the vibration of the motor 30 may not be transmitted to the case 12 through the support member 14. Further, since the shock absorbing members 16 are inserted from the bottoms of the through holes 28, respectively, and are fixed to the U-shaped plate 27, the distance between the motor 30 and the U-shaped plate 27 is small. As a result, the case 12 can be made compact. Further, the axial length of each cylindrical portion 18 can be made sufficiently long. Therefore, the shock absorbing members 16 can sufficiently damp vibration of the motor 30. Since the motor 30 is adhered to the support surfaces 20 of the support portions 22, the screw holes need not be formed in the motor 30.

Figure 3:
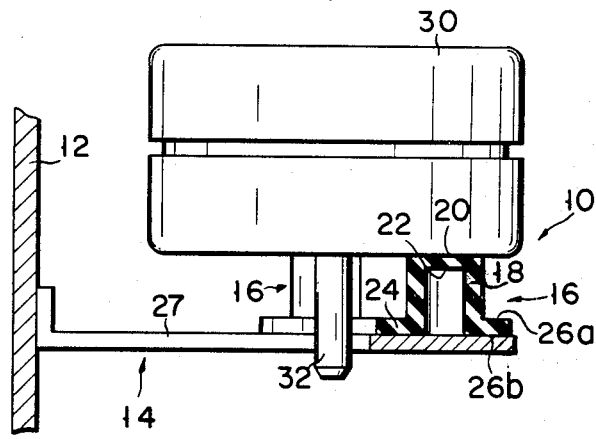
FIG. 3 is a partially cutaway side view of a motor support apparatus according to another embodiment of the present invention.

According to the above embodiment, the shock absorbing members 16 are inserted from the bottoms of the through holes 28, respectively, and the first fixing surfaces 26a of the fixing portions 24 are adhered to the lower surface of the U-shaped plate 27. However, as shown in FIG. 3, through holes may not be formed in the U-shaped plate. The second fixing surfaces 26b of the fixing portions of the shock absorbing members may be adhered to the upper surface of the U-shaped plate 27 instead. With this arrangement, the shock absorbing members 16 are more properly adhered to the U-shaped plate 27. The same reference numerals as in FIG. 1 denote the same parts in FIG. 3. The cylindrical portion of the shock absorbing member need not be cylindrical in shape. Other shapes such as hexagonal and quadrangular hollow prisms may also be utilized to obtain the same effects. The shock absorbing member need not be made of an elastic material such as rubber. Instead, other elastic materials such as an elastic resin may be utilized. Further, the number of shock absorbing members need not be three, but may vary as needed. The positions of the shock absorbing members are not particularly limited only if the motor is supported properly.

What we claim is:

1. A motor support apparatus for supporting a motor, comprising:
   a support member which includes a plate having a circular through hole therein, said plate having first and second opposed faces; and
   at least one shock absorbing member for elastically supporting the motor, said at least one shock absorbing member including a cylindrical portion made of an elastic material and adapted to absorb motor vibration, said cylindrical portion having two ends, a support portion disposed at one end of said cylindrical portion, and a fixing portion radially extending outwardly from the other end of said cylindrical portion, said cylindrical portion having an outer diameter smaller than the diameter of said through hole of said plate, and said cylindrical portion being received into said through hole from its one end so that said one end extends above the first face of said plate and the outer peripheral surface of said cylindrical portion is spaced apart from the inner edge of said through hole, said fixing portion having a radially directed surface which is adhered to the second face of said plate, and said supporting portion adapted to be fixed to an outer surface of the motor above and spaced from said first face of said plate, whereby said shock absorbing member does not contact said first face or said inner edges of said through hole of said plate.

2. The apparatus of claim 1, wherein said fixing portion has an annular shape, an outer diameter larger than the diameter of said through hole, and a fixing surface facing said one end of said cylindrical portion and perpendicular to the axis of said cylindrical portion, said fixing surface being fixed to said second face of said plate, and said cylindrical portion vertically extending through said through hole and above said second opposed face of said plate.

3. The apparatus of claim 1, wherein said support portion comprises a substantially flat support surface which closes said one end of said cylindrical portion, said support surface being perpendicular to the axis of said cylindrical portion, and said support surface adapted to be fixed to the outer surface of the motor.

4. The apparatus of claim 1, wherein said cylindrical portion is substantially coaxially received in said through hole.

5. The apparatus of claim 1, wherein said cylindrical portion, said support portion, and said fixing portion are integrally formed as a single unit of an elastic material.

6. The apparatus of claim 1, wherein a plurality of said shock absorbing members are provided spaced apart from each other at a predetermined distance from each other, and a plurality of said through holes are formed in said plate, whereby the cylindrical portion of each of said plurality of shock absorbing members is received in a respective one of said plurality of through holes in said plate.

7. The apparatus of claim 6, wherein said cylindrical portion, said support portion, and said fixing portion of each shock absorbing member are integrally formed as a single unit of an elastic material.

8. The apparatus of claim 6, comprising three of said shock absorbing members.

9. The apparatus of claim 8, wherein said shock absorbing members are spaced from each other by about 90°.

10. The apparatus of claim 1, wherein said fixing portion comprises a circular flange radially extending from said other end of said cylindrical portion, and said support portion comprises a substantially flat support surface which closes said one end of said cylindrical portion, said support surface being perpendicular to the axis of said cylindrical portion, and said support surface adapted to be fixed to the outer surface of the motor.

11. The apparatus of claim 10, wherein said cylindrical portion, said support portion, and said fixing portion are integrally formed as a single unit of an elastic material.

12. The apparatus of claim 1, wherein said outer peripheral surface of said cylindrical portion is spaced from the inner edge of said through hole by a distance between about 10 to 20% of the outer diameter of said cylindrical portion.

* * * * *